United States Patent [19]
Ryan

[11] Patent Number: 5,167,570
[45] Date of Patent: Dec. 1, 1992

[54] FISH TAIL SPLITTING METHOD AND APPARATUS

[76] Inventor: Robert M. Ryan, 5651 - 40th Ave. West, Seattle, Wash. 98199

[21] Appl. No.: 741,805

[22] Filed: Aug. 6, 1991

[51] Int. Cl.⁵ .................................................. A22C 25/16
[52] U.S. Cl. .................................... 452/160; 452/161
[58] Field of Search ......................... 452/160, 161, 149

[56] References Cited

U.S. PATENT DOCUMENTS

| | | | |
|---|---|---|---|
| 3,321,801 | 5/1967 | Westerdahl | 452/161 |
| 4,037,294 | 7/1977 | Cowie et al. | 452/161 |
| 4,484,375 | 11/1984 | Brower | 452/135 |
| 4,811,461 | 3/1989 | Behnk et al. | 452/121 |

FOREIGN PATENT DOCUMENTS

| | | | |
|---|---|---|---|
| 14871 | 10/1933 | Austria | 452/161 |
| 192008 | 1/1923 | United Kingdom | 452/161 |

Primary Examiner—Willis Little
Attorney, Agent, or Firm—Seed and Berry

[57] ABSTRACT

A fish tail splitting method and apparatus are disclosed in which a finger plate having a probe and a curved central portion is passed relative to the length of a fish. The finger probe is located into the rib tunnel along the vertebral column and the fish and finger plate move relative to one another separating the ribs and muscle tissue. The finger plate includes a sharpened portion such that the skin will also be severed. The tail splitting apparatus method separates the muscle tissue and ribs through the length of the fish exposing the kidney along the vertebral column and the vertebral column for subsequent processing.

11 Claims, 3 Drawing Sheets

A. FISH ENTERING MACHINE

FINGER UP

B. FISH TRIPS SWITCH

FINGER DOWN

C. TAIL SPLITTING

FINGER DOWN

RIB #24

RIB #32

RIB #38

FISH TAIL SPLITTING METHOD AND APPARATUS

DESCRIPTION

1. Technical Field

This invention pertains to processing of fish of the type having a vertebral column supporting soft muscle tissue and having a plurality of ribs defining a belly cavity and a tail behind the belly cavity terminating in a caudal fin. Typical of these types of fish are salmon. In particular, this invention pertains to splitting open the ribs and muscle tissue rearward of the belly cavity to expose the vertebral column and the kidney for further cleaning or further processing.

2. Background of the Invention

In most finned fish, the kidney is located directly below the vertebral column and extends usually from the head of the fish to the caudal fin. Throughout the kidney are blood passages. For a good product the viscera, including all kidney material and blood, must be removed from the fish, leaving primarily muscle tissue, skin, fat and bones. Incomplete removal of the kidney and blood can cause early deterioration of the muscle tissue and reduces the market value.

In fish which are headed and gutted, the belly is opened, the viscera removed, and the major portion of the kidney above the visceral cavity is removed. The remainder of the kidney in the tail portion of the fish is not accessible and is not removed.

In fish which are processed for canning, the head and tail are removed, and the belly cut open with a cut extending from head to tail. This cut is not intended to expose the bottom of the vertebral column and usually does not result in the removal of the kidney and blood vessels lying below the vertebral column.

In fish which are filleted, the belly is usually opened and the viscera removed as a first operation. The filets are then removed from the sides of the fish, leaving the bone frame. To efficiently filet a fish, it is necessary to mechanically locate the vertebral column, since the bones radiate from that structure. This is difficult since it is parallel to neither the top nor the bottom of the gutted fish. However, if the fish is split on center, exposing the bottom of the vertebral column along its complete length, the fish may be easily mounted in a machine with the vertebral column located for efficient filleting.

SUMMARY OF THE INVENTION

This invention pertains to cutting the tail portion of the fish from the belly cavity to the caudal fin along a line which exposes the vertebral column and the kidney. Particularly, the invention pertains to a method and apparatus by which the tail portion is cut by following the rib tunnel lying rearwardly of the belly cavity to locate a splitting device that separates the rejoined ribs and muscle tissue and skin in this tail portion.

Therefore it is an object of the invention to provide an improved method and apparatus for splitting the tail portion of a fish.

It is another object of this invention to provide a method and apparatus for automatically handling the fish and moving it through the splitting station in a commercial fish processing system using automated equipment.

It is particularly an object of this invention to provide a method and apparatus for splitting the tail of a fish by separating the rejoined ribs extending downwardly from the vertebral column rearward of the belly cavity.

It is desirable to separate the rejoined ribs without slicing through the ribs leaving portions of bone fragment in the edible muscle tissue. Thus the ribs must be gently separated without being severed. The fish has a tough skin, however, which generally must be sliced with a sharpened surface. It is important to avoid having this sharpened surface extend inwardly to an extent which it would cut a major portion of the ribs and muscle tissue.

DETAILED DESCRIPTION OF THE INVENTION

Figure 1:
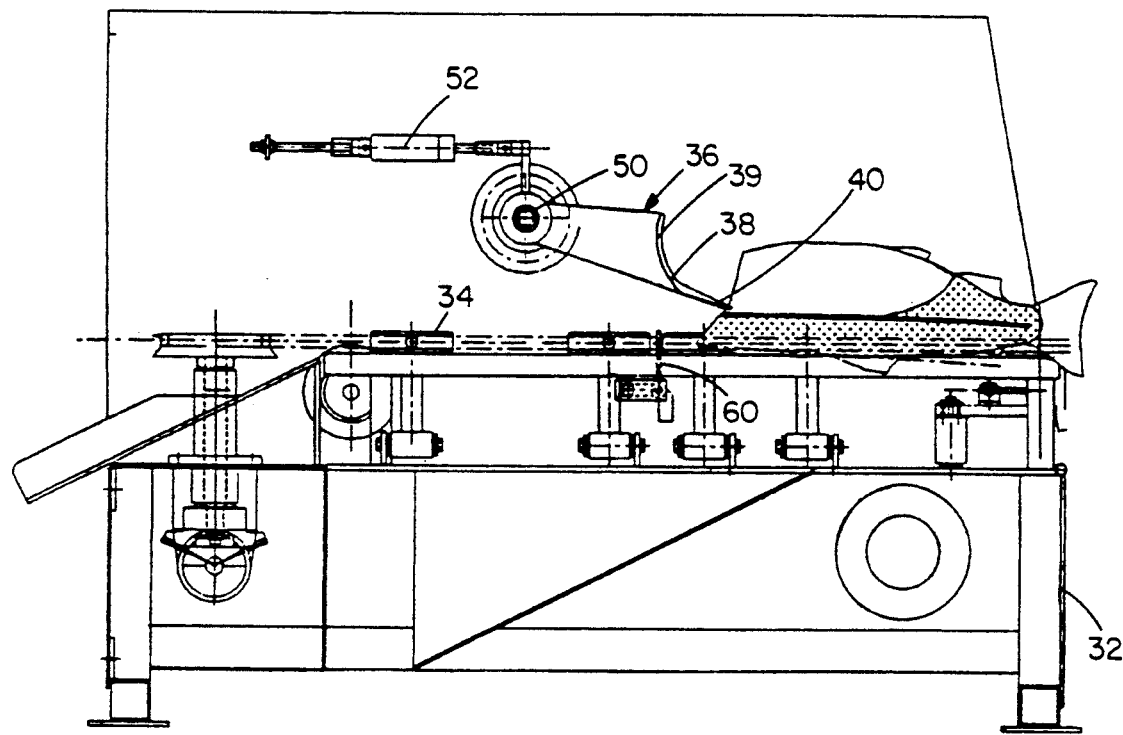
FIG. 1 is a side elevation partially in section showing apparatus for splitting the tail portion of a fish embodying the principle of the invention.
Figure 5:
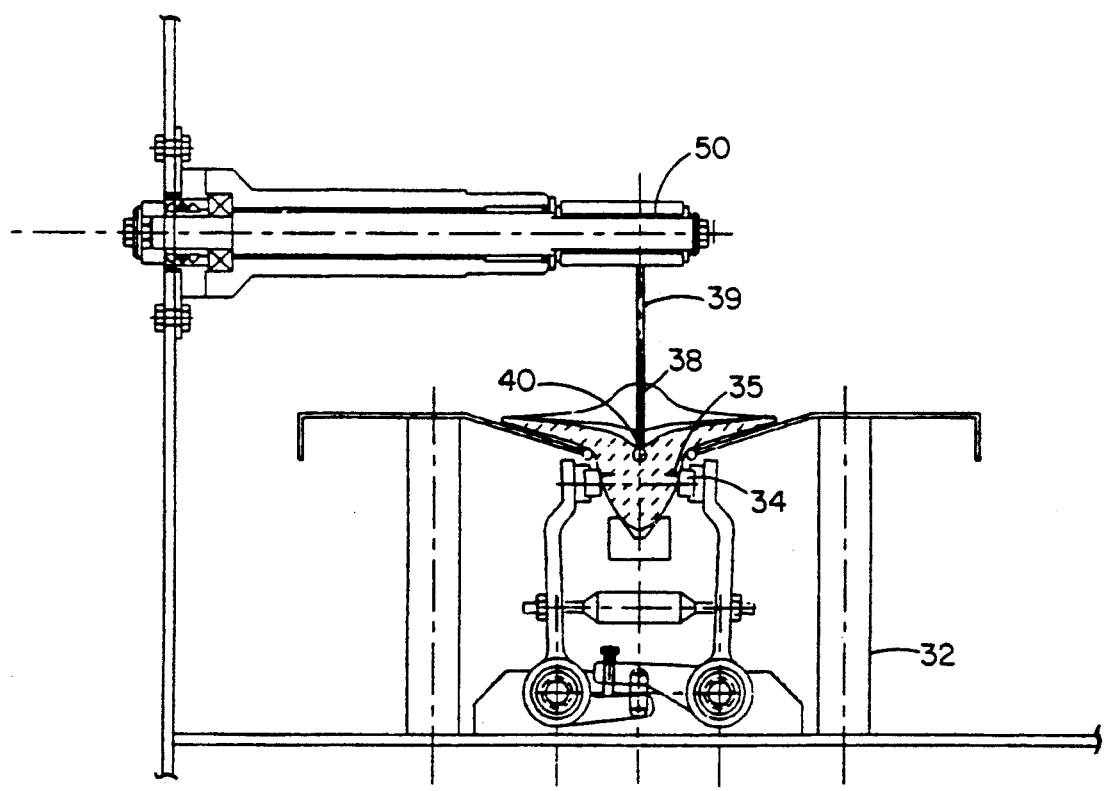
FIG. 5 is a transverse section taken through the apparatus of FIG. 1.

It is best to start describing the typical fish as shown in FIGS. 6-9. A fish has a lengthwise vertebral column 10 defining an upper set of ribs 12 and a lower set of ribs 14. At the top of the fish is a dorsal fin 16, an adipose fin 17, a caudal fin 18, and an anal fin 20.

Figure 7:
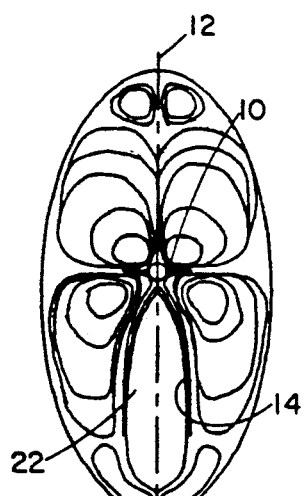
FIG. 7 is a transverse section taken along rib number 24 shown in FIG. 6.

The lower ribs 14 of the fish have different shapes as sections progress lengthwise along the fish. For example, FIG. 7 shows the lower ribs 14 separating and being spread a substantial distance to form a belly cavity 22 where the viscera (not shown) are retained. Along the underside in the belly cavity and throughout the length of the vertebral column is a kidney which contains the blood vessels. When the fish is split open during usual fish processing and the viscera removed from the belly cavity, it is a relatively easy matter to scrape the kidney from the underside of the vertebral column.

Figure 8:
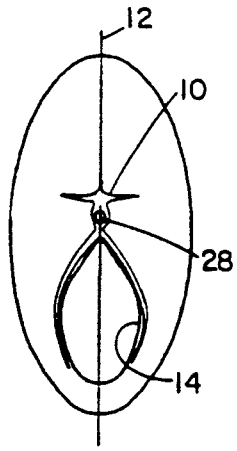
FIG. 8 is a transverse section taken along rib 32 of FIG. 6.
Figure 9:
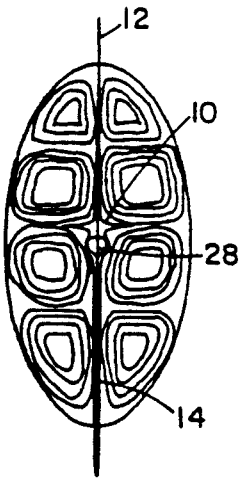
FIG. 9 is a transverse section taken generally along rib 38 of FIG. 6.

Moving along vertical sections rearward in the fish, the ribs 14 separate below the vertebral column 10 and rejoin. The separation forms a rib tunnel 28 best shown in FIGS. 8 and 9. At about rib number 32 the ribs separate, rejoin, and then separate again to form the belly cavity. The rib tunnel also starts out being very narrow at approximately rib number 32, as shown in FIG. 8, and gets slightly larger as it moves rearwardly as shown at rib 38. Rearward of the belly cavity the ribs separate, and rejoin to form a tunnel and then remain joined at rib number 38 as shown in FIG. 9. It is very difficult to separate those ribs from the outside in; however, by locating the rib tunnel 28 the rib tunnel can serve as a guide for a separating finger plate which is moved along the vertebral column outwardly through the tail portion of the fish.

FIG. 1 shows a fish processing conveyor 30 mounted on a frame 32. The conveyor is a conventional conveyor having chain-driven grippers 34 having conventional small points or spikes 35 which will grip the fish to propel the fish lengthwise belly up over the frame. Generally the fish has progressed downstream from a fish gutting machine where the viscera were removed and the belly cavity opened and cleaned. Thus FIG. 1 can be considered the tail portion splitting station of a mechanized fish processing line. While the fish is shown belly up, it should be understood that the fish could also be processed and its tail portion split being conveyed on its side or being conveyed belly down and the fish can also remain stationary while the splitting apparatus moved through the fish.

The preferred embodiment shows the fish being conveyed belly up in the tail portion splitting station. Positioned above the belly is a finger plate 36 having a central portion 38, a skin slicing portion 39, and a probe portion 40. The probe portion 40 is blunted and terminates in a small point which can be guided into the rib tunnel 28. The central portion passes through the tail portion of the fish and separates the ribs 14 as they move up along the central portion. The ribs are split along with the soft muscle tissue adjoining the ribs. The blade portion 39 is of a substantially short length so that it does not sever the soft muscle tissue and ribs unnecessarily. Since the size of the fish will vary, the exact length of the blade is a compromise to try not to extend inwardly too far to sever any of the ribs. Furthermore, the skin rides up the central portion until it engages the blade portion and then is cut. In those types of fish where the skin is very tough, as in some species of salmon, a removable surgically sharp blade of surgical steel can be added to the blade portion. The blade would be used and replaced when it became too dull to cut through the fish skin.

In some instances the size of the fish may vary so greatly that the cutting of the skin will be done upstream before the fish reaches the splitting finger plate. In this situation the skin would be scored by slicing the skin lengthwise. A subsequent blade or skin slicing portion on the finger plate would therefore not always be necessary.

Figure 2:
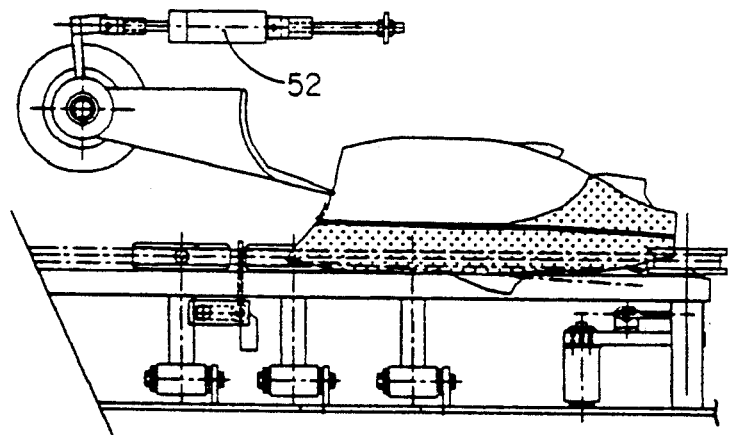
FIG. 2 is a schematic operational view showing a fish in a tail splitting station of a fish processing machine.
Figure 3:
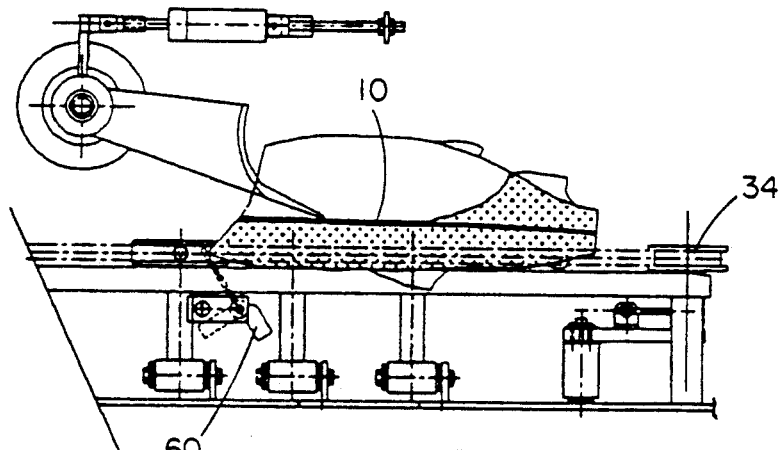
FIG. 3 shows a fish progressing through the tail splitting station with a finger plate lowered into sliding engagement with the vertebral column.
Figure 4:
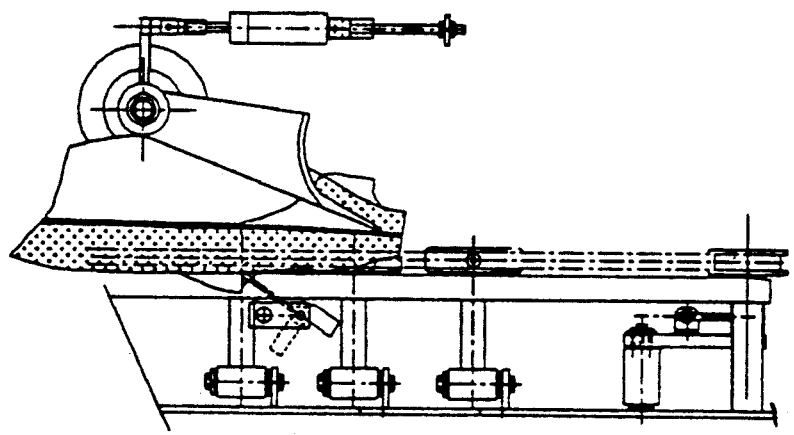
FIG. 4 shows the finger plate proceeding through the tunnel rearward of the belly cavity separating the ribs and muscle tissue and cutting the tough skin.
Figure 6:
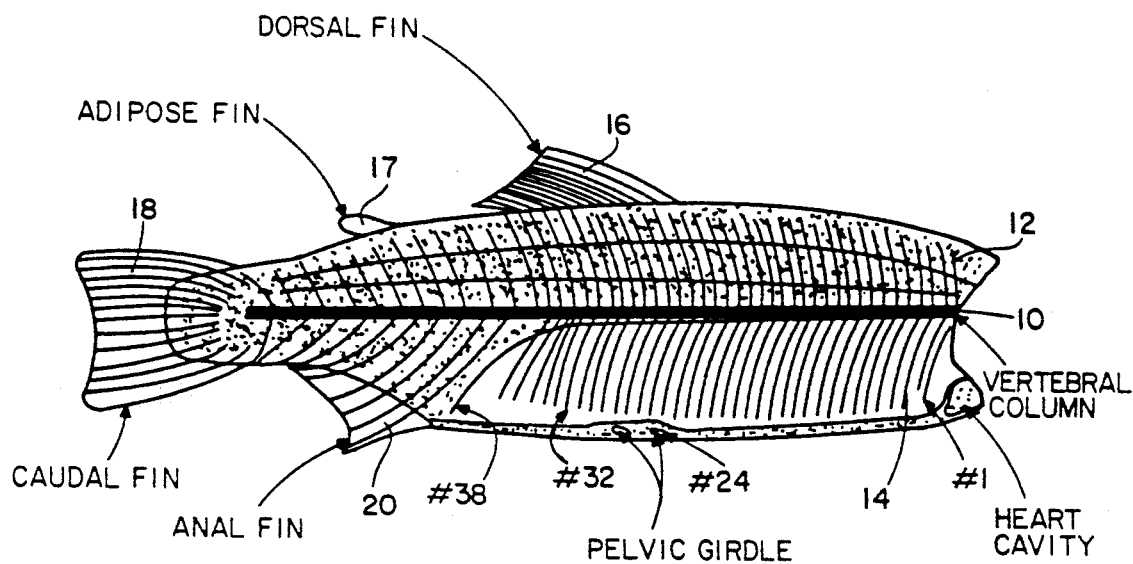
FIG. 6 is a longitudinal section of a typical fish, such as a salmon, showing the structure of the fish for informational purposes.

The finger plate is connected to a pivot 50 which can be pivoted from an upper position shown in FIG. 2 to a lower position shown in FIG. 3 by an air cylinder 52. In the lower position the probe portion 40 is allowed to move down and rest on the vertebral column 10. As the fish progresses past the probe the probe slides into the rib tunnel 28 and thus locates the blade accurately along the underside of the vertebral column. As best shown in FIG. 4, the fish is then moved past the entire finger plate with the probe locating the finger plate in the rib tunnel, the central portion gently separating the ribs and the muscle tissue while the blade portion cuts the skin.

Once the tail portion is split open the remaining kidney can be cleaned or other processing can occur using the vertebral column as a locating line, accurately establishing the location of the upper and lower ribs.

The conveyor is provided with a sensor such as a trip switch 60 that is engaged by the body of the fish as it is moved along the conveyor. This signals the air cylinder to release the finger and allow the finger to fall downwardly, as best shown in FIG. 3. When the fish leaves the trip switch 60, the air cylinder is again energized to raise the finger plate after a short delay.

While the preferred embodiments of the invention have been illustrated and described it should be understood that variations will be apparent to one skilled in the art. Particularly, the fish could be conveyed belly down along the conveyor and through the tail portion splitting station, leaving it in an ideal condition for subsequent filleting of the fish. It is thus understood that the invention should not be limited to the specific form illustrated in the drawings.

I claim:

1. Apparatus for splitting the tail of a fish of the type having a body of soft muscle tissue surrounded by a tough skin, a lengthwise vertebral column, ribs diverging from the vertebral column and rejoining to form a rib tunnel, and then continuing outwardly through the fish away from the vertebral column, comprising:

means for supporting a fish with the belly cavity exposed;

relatively blunt rib separating means for entering the tunnel formed by the ribs adjacent the vertebral column and for pushing outwardly from within the tunnel away from the vertebral column toward the bottom of the fish for separating the rejoined ribs while the ribs remain attached to the vertebral column along the length of the fish; and means for moving the supporting means and rib separating means lengthwise of the fish relative to one another so that the rib separating means moves along the tunnel to separate the ribs.

2. The apparatus of claim 1, further including sharp cutting means on the rib separating means, but spaced outwardly of the vertebral column into the vicinity only of the skin, for slicing the skin along the area where the rejoined ribs have been separated to expose the vertebral column for the full length of the fish.

3. The apparatus of claim 1, said rib separating means including a finger plate having a curved blunt central portion, a lengthwise protruding blunt probe portion, and a depthwise outer skin slicing portion.

4. The apparatus of claim 1, said means for supporting the fish including a conveyor having a fish moving mechanism for moving the fish with the belly open, said rib separating means positioned opposed to the conveyor and being movable through the open belly into engagement with the vertebral column for guiding the rib separating means into the rib tunnel.

5. Apparatus for splitting the tail and exposing the vertebral column and kidney in the tail of a fish having muscle tissue, a vertebral column running the length of the fish from the head to the caudal fin, the vertebral column being joined to ribs defining on one side of the vertebral column a belly cavity, the ribs diverging from the vertebral column and then rejoining to form a rib tunnel to the rear of the belly cavity and beyond to the caudal fin, comprising:

a support member for holding a fish with its belly cavity, open to expose the vertebral column, an elongated laterally curved finger plate having an inner blunt probe, a central blunt portion and an outer skin cutting portion;

an actuator for moving the finger plate so that the probe contacts the vertebral column and is guided into the rib tunnel; and means for moving the support member and finger plate relative to one another lengthwise of the fish so that the probe moves along the rib tunnel toward the caudal fin while the finger plate central portion separates the joined ribs and muscle tissue, and the outer skin cutting portion slices the skin to expose the vertebral column for the full length of the fish.

6. A method of splitting the ribs of a fish to expose the vertebral column along the length of the fish, the fish being of the type having soft muscle tissue surrounding a vertebral column extending along the length of the fish, the vertebral column having ribs defining a belly cavity, the ribs continuing rearwardly beyond the belly cavity diverging from the vertebral column and rejoining to form a rib tunnel, the muscle tissue covered by a skin, comprising:

moving the fish along a path with the fish belly cavity open;

moving a blunt surface longitudinally along the rib tunnel of the rejoined ribs and through the rejoined ribs and muscle tissue and pushing the blunt surface outwardly away from the vertebral column from within the tunnel while the ribs remain attached to the vertebral column to separate the rejoined ribs and muscle tissue from the belly cavity to the end of the fish; and severing the skin between the belly cavity and the remaining end of the fish to expose the vertebral column for the full length of the fish.

7. The method of claim 6 wherein the fish has a kidney along the vertebral column and including removing the kidney in the area of the separated ribs, muscle tissue and skin between the belly cavity and the caudal fin.

8. The method of claim 6, including the step of automatically sensing the presence of the fish at a predetermined position along said path, and automatically moving the blunt surface into alignment with the rib tunnel in response to said sensed predetermined position of the fish.

9. The method of claim 6 wherein the step of severing the skin occurs after the ribs and muscle tissue are separated.

10. Apparatus for splitting the tail of a fish of the type having a body of soft muscle tissue surrounded by a tough skin, a lengthwise vertebral column, ribs diverging from the vertebral column and rejoining to form a rib tunnel, and then continuing outwardly through the fish, comprising;

means for supporting a fish with the belly cavity exposed;

rib separating means for entering the tunnel formed by the ribs adjacent the vertebral column and separating the ribs along the length of the fish throughout its depth and length;

means for moving the supporting means and rib separating means lengthwise of the fish relative to one another so that the rib separating means moves along the tunnel to separate the ribs;

said rib separating means further including means for releasing the finger plate to fall into contact with the vertebral column for sliding along the vertebral column into the tunnel; and said rib separating means including a finger plate having a curved blunt central portion, a lengthwise protruding blunt probe portion, and a depthwise outer skin slicing portion.

11. Apparatus for splitting the tail of a fish of the type having a body of soft muscle tissue surrounded by a tough skin, a lengthwise vertebral column, ribs diverging from the vertebral column and rejoining to form a rib tunnel, and then continuing outwardly through the fish, comprising:

means for supporting a fish with the belly cavity exposed;

rib separating means for entering the tunnel formed by the ribs adjacent the vertebral column and separating the ribs along the length of the fish throughout its depth and length;

means for moving the supporting means and rib separating means lengthwise of the fish relative to one another so that the rib separating means moves along the tunnel to separate the ribs;

rib separating means including a finger plate having a curved blunt central portion, a lengthwise protruding blunt probe portion, and a depthwise outer skin slicing portion, said finger plate being pivotally mounted on a pivot member, actuator means for releasing said finger plate to fall into contact with the vertebral column, and switch means responsive to the presence of a fish on the fish supporting means at a predetermined position for activating the actuator means to release the finger plate to move toward the fish; and means for supporting the fish including a conveyor having a fish moving mechanism for moving the fish with the belly open, said rib separating means positioned opposed to the conveyor and being movable through the open belly into engagement with the vertebral column for guiding the rib separating means into the rib tunnel.

* * * * *